United States Patent
Mikami (10) Patent No.: US 9,139,229 B2
(45) Date of Patent: Sep. 22, 2015

(54) STRUCTURE FOR REAR PART OF VEHICLE BODY

(71) Applicant: HONDA MOTOR CO., LTD., Minato-Ku, Tokyo (JP)

(72) Inventor: Kazumi Mikami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/407,118

(22) PCT Filed: Apr. 10, 2013

(86) PCT No.: PCT/JP2013/060826
§ 371 (c)(1),
(2) Date: Dec. 11, 2014

(87) PCT Pub. No.: WO2013/187112
PCT Pub. Date: Dec. 19, 2013

(65) Prior Publication Data
US 2015/0158530 A1  Jun. 11, 2015

(30) Foreign Application Priority Data

Jun. 15, 2012 (JP) .................... 2012-136012

(51) Int. Cl.
*B62D 21/11* (2006.01)
*B62D 21/15* (2006.01)
*B60K 15/01* (2006.01)
*B60K 15/063* (2006.01)
(Continued)

(52) U.S. Cl.
CPC .............. *B62D 21/155* (2013.01); *B60K 15/01* (2013.01); *B60K 15/063* (2013.01); *B62D 21/00* (2013.01); *B62D 21/11* (2013.01); *B60K 2015/0474* (2013.01); *B60K 2015/0638* (2013.01)

(58) Field of Classification Search
CPC ...... B62D 21/155; B62D 21/00; B62D 21/11; B60K 15/01; B60K 15/063; B60K 2015/0474; B60K 2015/0638
See application file for complete search history.

(56) References Cited

U.S. PATENT DOCUMENTS 4,440,435 A * 4/1984 Norlin ................. 296/187.09
5,364,128 A * 11/1994 Ide ............................ 280/784
5,562,308 A * 10/1996 Kamei et al. ............. 280/788

(Continued)

FOREIGN PATENT DOCUMENTS

JP   08-230711 A   9/1996
JP   2000-006674 A   1/2000

(Continued)

*Primary Examiner* — Laura Freedman
(74) *Attorney, Agent, or Firm* — Carrier Blackman & Associates, P.C.; Joseph P. Carrier; William D. Blackman (57) ABSTRACT

A structure for a rear part of a vehicle body includes a rear sub-frame supported by rear side frames. The rear sub-frame includes left and right longitudinal members, and a front lateral member mounted across the left and right longitudinal members. The left and right longitudinal members each have front and rear fastening sections fastened to each of a pair of left and right rear side frames, and left and right bent sections each bent inward in the vehicle width direction between the front and rear fastening sections. The front lateral member is positioned relative to the left and right longitudinal members at the intermediate portions of the left and right bent sections. The intermediate portions of the left and right bent sections are joined to the pair of rear side frames while the left and right longitudinal members are held by the lateral member.

3 Claims, 11 Drawing Sheets

(51) Int. Cl.
  *B62D 21/00*   (2006.01)
  *B60K 15/04*   (2006.01)

(56) References Cited

U.S. PATENT DOCUMENTS

| | | | |
|---|---|---|---|
| 5,609,366 A * | 3/1997 | Kamei et al. | 280/788 |
| 6,193,274 B1 * | 2/2001 | Brown et al. | 280/784 |
| 6,390,224 B1 * | 5/2002 | Yoshida | 180/312 |
| 7,213,873 B2 * | 5/2007 | Murata et al. | 296/204 |
| 7,360,621 B2 | 4/2008 | Komiya | |
| 7,393,016 B2 * | 7/2008 | Mitsui et al. | 280/784 |
| 7,654,543 B2 * | 2/2010 | Tanaka et al. | 280/124.109 |
| 7,771,137 B2 * | 8/2010 | Anzai et al. | 403/379.3 |
| 8,025,313 B2 | 9/2011 | Tanaka et al. | |
| 8,267,429 B2 * | 9/2012 | Takeshita et al. | 280/784 |
| 8,393,673 B2 * | 3/2013 | Terada et al. | 296/193.09 |
| 8,480,102 B2 * | 7/2013 | Yamada et al. | 280/124.109 |
| 8,523,258 B2 * | 9/2013 | Ohhama et al. | 296/35.1 |
| 8,746,718 B2 * | 6/2014 | Otani et al. | 280/124.109 |
| 8,857,836 B2 * | 10/2014 | Okuyama et al. | 280/124.109 |
| 8,998,305 B2 * | 4/2015 | Obata et al. | 296/193.08 |
| 2011/0266785 A1 * | 11/2011 | Mildner | 280/785 |
| 2013/0200653 A1 * | 8/2013 | Yasui et al. | 296/187.08 |

FOREIGN PATENT DOCUMENTS

| | | |
|---|---|---|
| JP | 2005-255067 A | 9/2005 |
| JP | 2005-255070 A | 9/2005 |
| JP | 2009-255902 A | 11/2009 |
| JP | 2010-030533 A | 2/2010 |

* cited by examiner

COMPARATIVE EXAMPLE

FIG. 10B

EXAMPLE

FIG. 11A
COMPARATIVE EXAMPLE

FIG. 11B
EXAMPLE

STRUCTURE FOR REAR PART OF VEHICLE BODY

TECHNICAL FIELD

The present invention relates to a vehicle body rear part structure including a pair of left and right rear side frames extending in a front-rear direction of a vehicle body, and a rear sub-frame supported by the rear side frames.

BACKGROUND ART

A structure for the rear part of a vehicle body includes a pair of left and right rear side frames extending in the front-rear direction of a vehicle, and a rear sub-frame supported by the rear side frames. As a similar technique, a suspension frame mounting structure includes a pair of left and right front side frames (front side members) extending in the front-rear direction of a vehicle, and a front sub-frame (suspension frame) mounted on the front side frames. In this technique, the front sub-frame has front and rear fastening sections to be fastened with the front side frames, and the positions of the rear fastening sections are aligned in a height direction with the center of the cross-section of the front side frames.

With such a suspension frame mounting structure, it is possible to input load to the center of the cross-section of the front side frames from the front sub-frames when the front sub-frames are moved (e.g., see Patent Literature 1).

A rear sub-frame (suspension sub-frame of the vehicle) used in the structure for the rear part of the vehicle body may include left and right longitudinal members extending in the front-rear direction of the vehicle body, a front lateral member extending in a vehicle width direction and stretched between the left and right longitudinal members, and a rear lateral member extending in the vehicle width direction in the vehicle rear part behind the front lateral member and stretched between the left and right longitudinal members (e.g., see Patent Literature 2).

Upper and lower support sections that support an upper link and a lower link, respectively, are provided on the front lateral member. An arm support sections that supports the lower arm is provided on the rear lateral member. As in the suspension frame mounting structure of Patent Literature 1, the pair of rear side frames extend in the front-rear direction of the vehicle, and the rear sub-frame includes front and rear fastening sections formed on the left and right longitudinal members of the rear sub-frame, with the front and rear fastening sections being mounted on the rear side frames. In the rear sub-frame mentioned above, at least one of the support sections of the upper and lower support sections is formed as a separate member other than the front lateral member.

Since at least one of the support sections of the upper and lower support sections is formed as a separate member other than the front lateral member in the rear sub-frame disclosed in Patent Literature 2, it is possible to improve measurement accuracy and rigidity of the support sections.

In the suspension frame mounting structure of Patent Literature 1, a portion between the front end of the front side frame and the front fastening section is set as a collision stroke portion when a front collision load is acted from the front of the vehicle. A portion between the front and rear fastening sections is set as a crush preventing portion (portion not to be crushed) to prevent crush when the front collision load is acted.

However, if the front part of the vehicle body of the vehicle is not long enough to secure sufficient collision stroke portion from the front end to the front fastening section of the front side frame, some means have to be provided to absorb the front collision load from the front of the vehicle.

As in the suspension frame mounting structure of Patent Literature 1, the structure for the rear part of the vehicle body that supports the rear sub-frame of Patent Literature 2 also includes the collision stroke portion set between the rear end and the rear fastening section of the rear side frame to absorb impact when the rear collision load is acted from behind the vehicle, and a crush preventing portion (portion not to be crushed) set between the rear fastening section and the front fastening section to prevent crush when the rear collision load is acted. However, if the vehicle cannot secure sufficient collision stroke portion from the rear end to the rear fastening section of the rear side frame, some improvements have to be made to sufficiently absorb the rear collision load from behind the vehicle.

Further, in the structure for the rear part of the vehicle body in which the pair of rear side frames extend in the front-rear direction of a vehicle and the rear sub-frame is supported by the rear side frames, a filler pipe that supplies fuel to a fuel tank is arranged in the collision preventing portion between the rear fastening section and the front fastening section, with the filler pipe being protected in the collision preventing section. If, however, the vehicle cannot secure sufficient collision stroke portion from the rear end to the rear fastening section of the rear side frame, some improvements have to be made to protect the filler pipe.

PRIOR ART LITERATURE

Patent Literature

Patent Literature 1: JP 8-230711 A
Patent Literature 2: JP 2010-30533 A

SUMMARY OF INVENTION

Technical Problem

An object of the present invention is to provide a structure for the rear part of a vehicle body capable of improving absorption of impact even when a vehicle has insufficient collision stroke portion between the rear end of the rear sub-frame and the rear fastening section of the rear side frame when the rear collision load is acted from behind the vehicle.

Another object is to provide a structure for the rear part of a vehicle body capable of improving strength and rigidity against the rear collision load of the rear sub-frame. Another object is to provide a structure for the rear part of a vehicle body capable of protecting the filler pipe from the rear collision load, when the filler pipe of the fuel tank is arranged in the crush prevention portion between the rear fastening section and the front fastening section of the rear sub-frame.

Solution to Problem

According to the invention as recited in claim 1, a structure for the rear part of a vehicle body includes a pair of left and right rear side frames extending in the front-rear direction of a vehicle body, and a rear sub-frame supported by the left and right rear side frames. Each of the pair of left and right rear side frames includes a curved section curved such that a frame front part is lower than a frame rear part. The rear sub-frame includes left and right longitudinal members extending in the front-rear direction of the vehicle body and a lateral member extending in a vehicle width direction and stretched between the left and right longitudinal members. The left and right longitudinal members each have front and rear fastening sections fastened to each of the pair of the left and right rear side frames, and left and right bent sections each bent inward in a vehicle width direction in a projecting manner between the front and rear fastening sections. The lateral member is positioned relative to the left and right longitudinal members at an intermediate portion of the left and right bent sections. The intermediate portions of the left and right bent sections are joined to the pair of the rear side frames while the left and right longitudinal members are held by the lateral member.

According to the invention as recited in claim 2, the lateral member preferably includes left and right connecting members connected to the pair of left and right rear side frames at the intermediate portions of the left and right bent sections of the left and right longitudinal members.

According to the invention as recited in claim 3, a fuel tank is preferably provided in front of the lateral member and a filler pipe is provided on the fuel tank. The filler pipe extends from the fuel tank and runs under the curved section and in front of one of the left and right connecting members to go out to the side of the vehicle.

Advantageous Effects of Invention

According to the invention as recited in claim 1, the position of the lateral member relative to the left and right longitudinal members is the intermediate portion of the left and right bent section, and the lateral member is joined to the pair of rear side frames while holding the left and right longitudinal members. Accordingly, it is possible to divide the left and right bent sections in the front-rear direction of the vehicle body into the front side portion from the front fastening section to the connecting member and the rear side portion from the connecting member to the rear fastening section.

Specifically, it is possible to set the front side portion as the protection section to restrict deformation of the vehicle body, and the rear side portion as the deformation allowable portion to allow deformation of the vehicle body. As a result, deformation of the front side portion of the rear sub-frame can be prevented when the rear collision load is acted from the rear side of the vehicle body. At the same time, the rear side portion of the rear sub-frame can be used for absorbing impact (crush stroke), such that even when a vehicle has insufficient collision stroke portion (energy absorbing portion) from the rear end of the vehicle body to the rear fastening section, impact can be sufficiently absorbed.

According to the invention as recited in claim 2, the lateral member includes left and right connecting members connected to each of the pair of left and right rear side frames at the intermediate portions of the left and right bent sections of the left and right longitudinal members. Therefore, the strength and rigidity against the rear collision load of the rear sub-frame can be improved, while easily holding the intermediate portions of the left and right bent sections by the pair of rear side frames. Accordingly, it is possible to protect a region of the vehicle body in front of the left and right connecting members when the rear collision load is acted from behind the vehicle body.

According to the invention as recited in claim 3, the fuel tank is arranged in front of the lateral member and the filler pipe is provided on the fuel tank. The filler pipe extends from the fuel tank to run under the curved section and in front of the connecting member to go out to the side of the vehicle body, to thereby protect the filler pipe from the rear collision load. As a result, the reliability of the filler pipe against the rear collision load can be improved.

MODE FOR CARRYING OUT THE INVENTION

A preferred embodiment of the present invention will be described in detail below with reference to the accompanying drawings.

Embodiments

Figure 1:
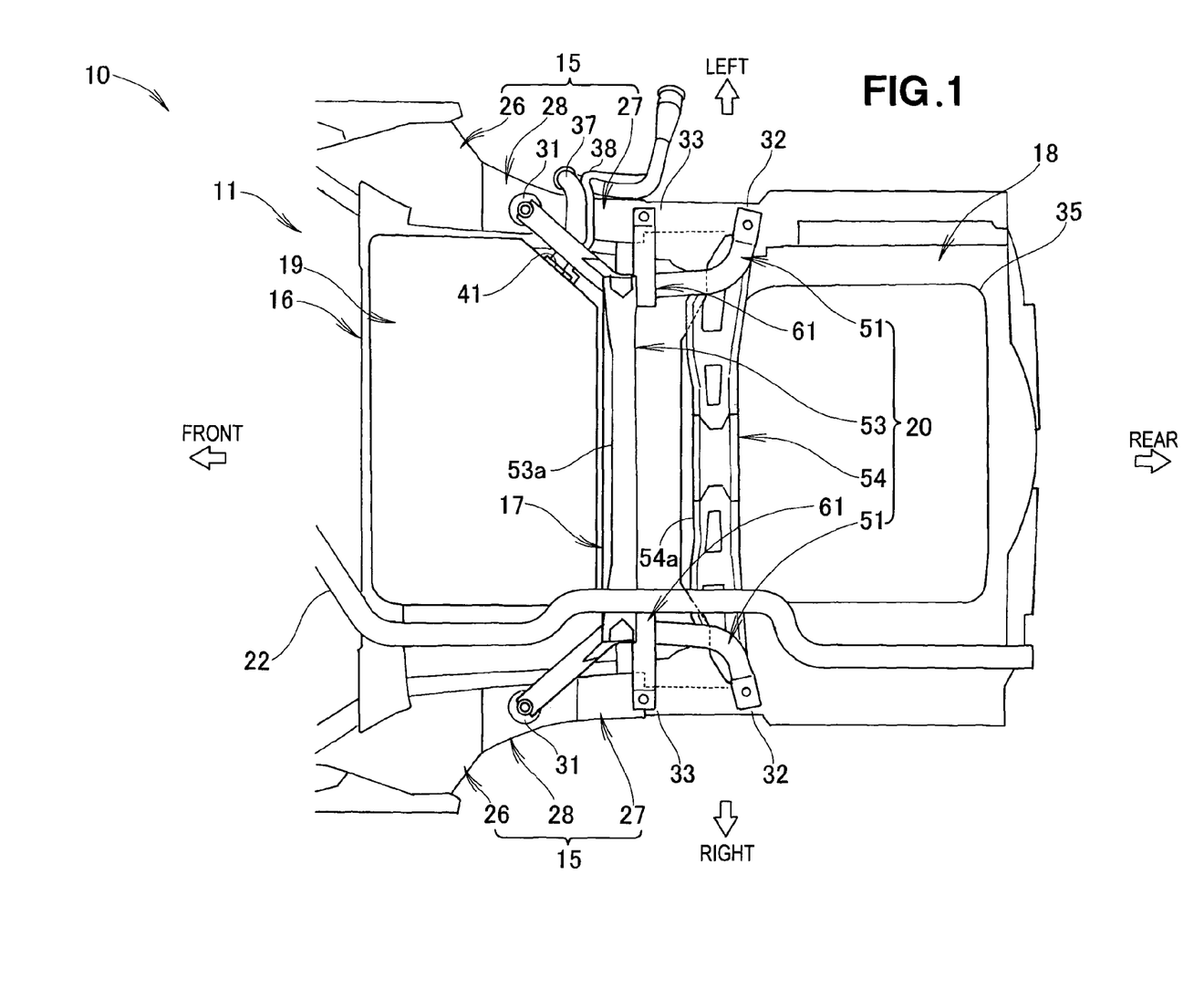
FIG. 1 is a bottom view of a vehicle body rear part structure according to the present invention.
Figure 2:
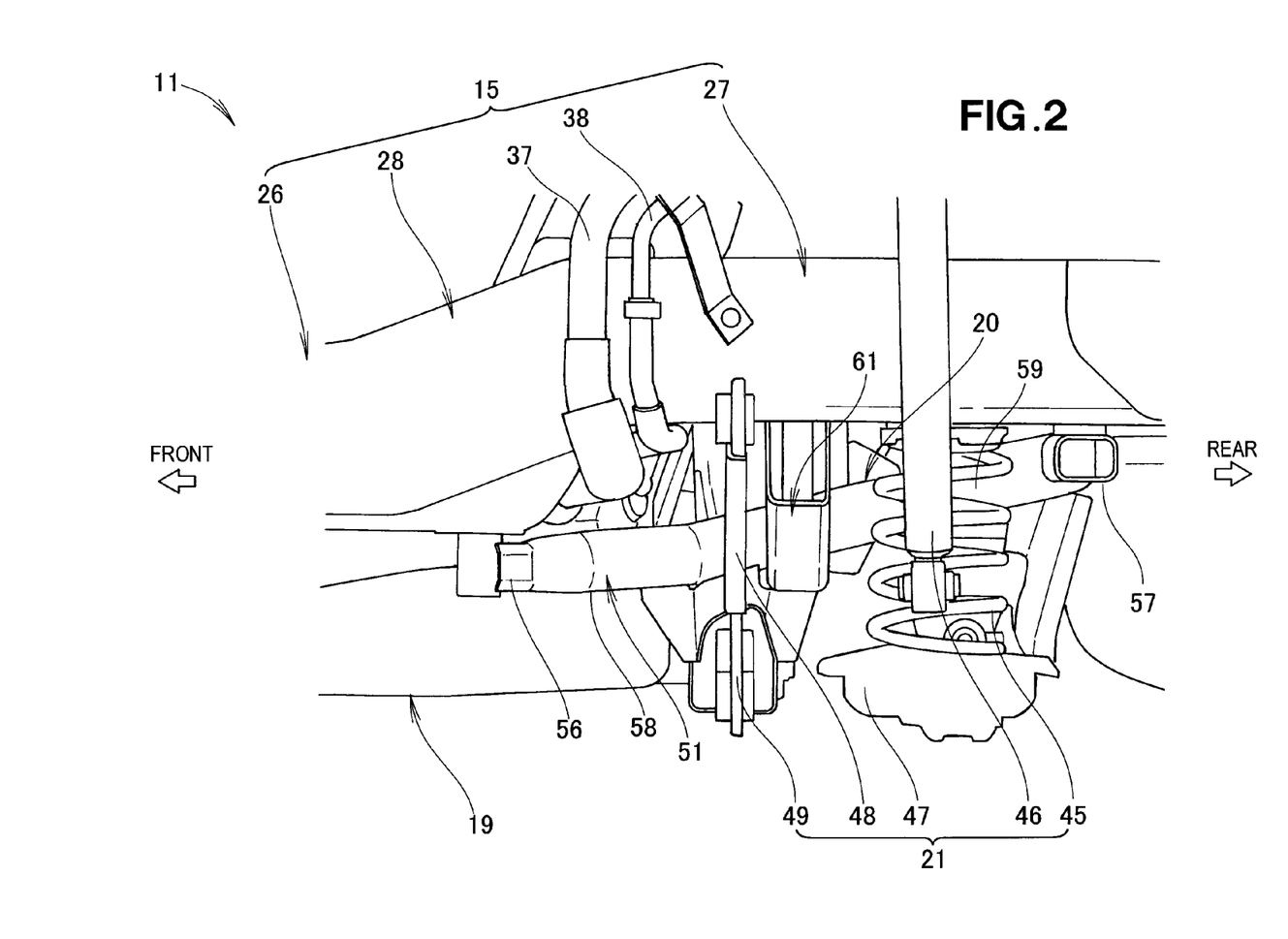
FIG. 2 is a side view of the vehicle body rear part structure of FIG. 1.
Figure 3:
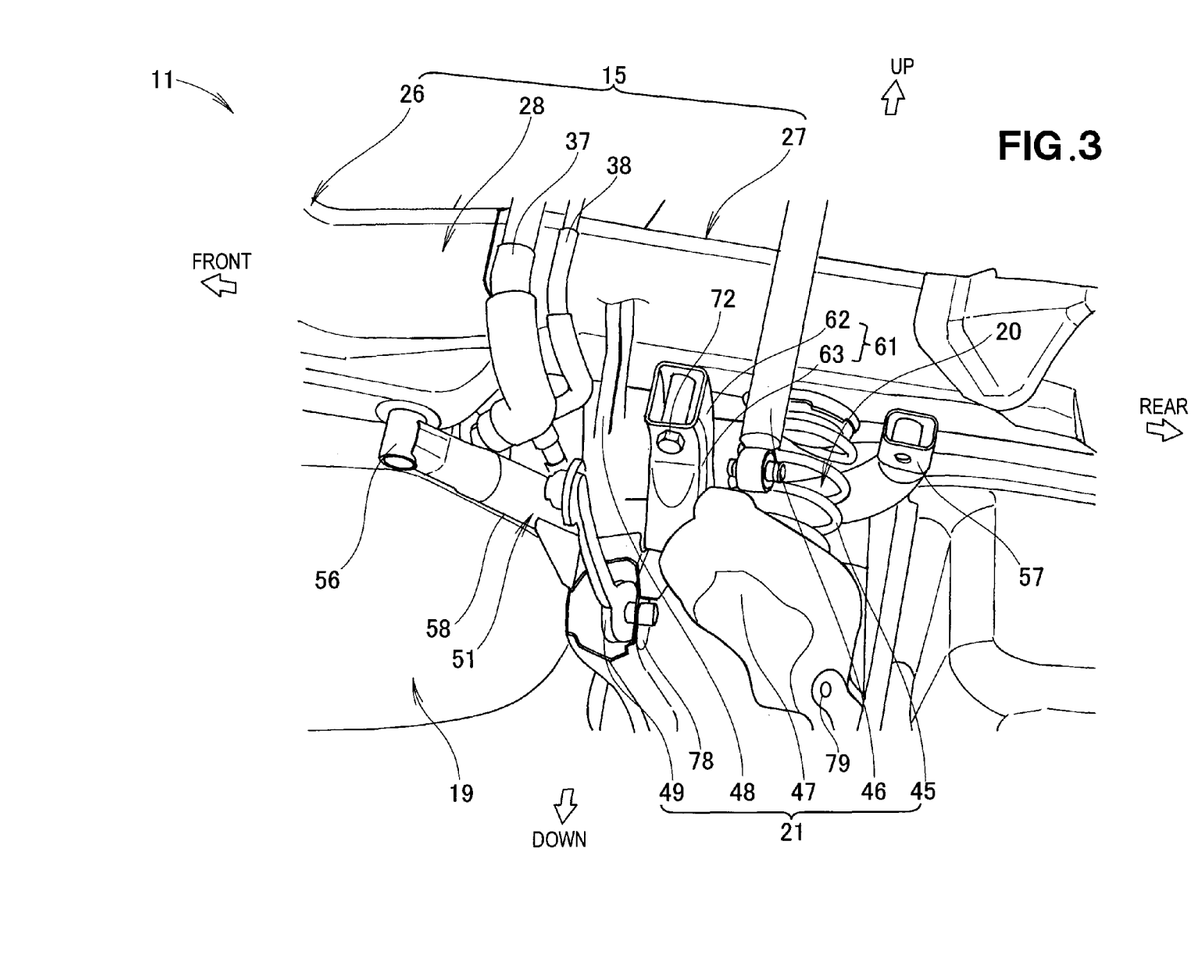
FIG. 3 is a perspective view of the vehicle body rear part structure of FIG. 1.

As illustrated in FIGS. 1 to 3, a vehicle 10 includes a pair of rear side frames 15 arranged in the rear part of a vehicle body 11 and extending in the front-rear direction of the vehicle body 11, first and second rear cross members 16, 17 laid in a vehicle width direction between the rear side frames 15, a floor panel 18 provided on top of the rear side frames 15 and the first and second rear cross members 16, 17, a fuel tank 19 supported by the first and second rear cross members 16, 17, a rear sub-frame 20 supported by the rear side frames 15, a rear suspension 21 supported by the rear sub-frame 20, and an exhaust pipe 22 extending backward from the front of the vehicle body 11.

Each of the rear side frames 15 includes a frame front part 26 of the vehicle front part, a frame rear part 27 of the vehicle rear part, and a curved section 28 curved such that the frame front part 26 is lower than the frame rear part 27. The curved section 28 includes a front mounting section 31 to which a front fastening section 56 of the rear sub-frame 20 is fastened in the lower part thereof.

A front lateral member 53 located on the front side of the rear sub-frame 20 is fastened to the pair of rear side frames 15. The frame rear part 27 includes a rear mounting section 32 and a connecting member mounting section 33.

The first rear cross member 16 is arranged immediately in front of the fuel tank 19, while the second rear cross member 17 is arranged immediately behind the fuel tank 19. The floor panel 18 includes a floor pan (storage unit) 35 that stores spare tires and tools (not illustrated) in the vehicle rear part of the floor panel 18.

A filler pipe (fuel supply pipe) 37 that supplies fuel and a breather pipe (exhaust pipe channel for oil feeding) 38 that removes air from the fuel tank 19 are connected to the fuel tank 19. The fuel tank 19 is provided in front of the front lateral member 53 of the rear sub-frame 20 and mounted on the vehicle body 11.

The filler pipe 37 extends from a side face 41 of the rear left corner of the fuel tank 19 and runs between the bottom of the curved section 28 and the left longitudinal member 51 a side view and between the front fastening section 56 of the left longitudinal member 51 and the front lateral member 53 in a planar view to go out to the side of the vehicle body 11. Specifically, the filler pipe 37 is provided on the fuel tank 19 to extend from the side face 41 of the rear left corner of the fuel tank 19, and runs under the curved section 28 and in front of the front lateral member 53 to go out to the side of the vehicle body 11.

Similar to the filler pipe 37, the breather pipe 38 also runs between the curved section 28 and the left longitudinal member 51 in a side view and between the front fastening section 56 of the left longitudinal member 51 and the front lateral member 53 in a planar view to go out to the side of the vehicle body 11.

The rear suspension 21 includes a coil spring 45 that decreases impact from rear wheels (not illustrated), a damper 46 that converges expansion of the coil spring 45, a lower arm 47 extending from the rear lateral member 54 of the rear sub-frame 20 toward the rear wheel side, an upper link 48 extending from the upper part of the both ends of the front lateral member 53 of the rear sub-frame 20 toward the rear wheel side, and a lower link 49 extending from the lower part of both ends of the front lateral member 53 of the rear sub-frame 20 toward the rear wheel side.

Figure 4:
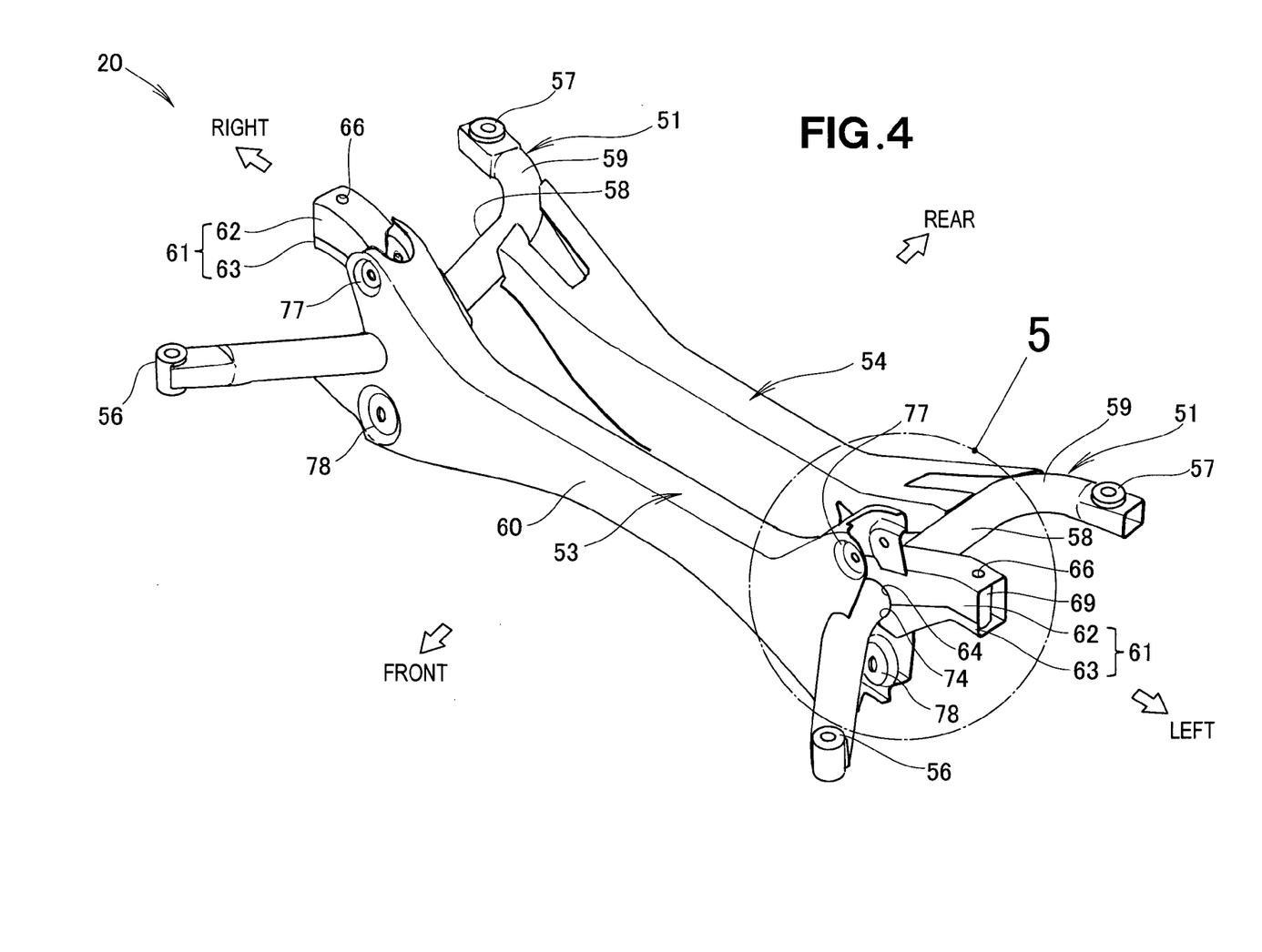
FIG. 4 is a perspective view of a rear sub-frame adopted in the vehicle body rear part structure of FIG. 1.

As illustrated in FIG. 4, the rear sub-frame 20 includes left and right longitudinal members 51 extending in the front-rear direction of the vehicle body 11, a lateral member (front lateral member) 53 extending in the vehicle width direction and laid between the left and right longitudinal members 51, and a rear lateral member 54 arranged in the rear part of the vehicle body behind the front lateral member 53 to extend in the vehicle width direction and laid between the left and right longitudinal members 51.

The front lateral member 53 includes upper link support sections 77, 77 provided in the upper part of both ends thereof to support the upper links 48 (FIG. 2) in a freely rockable manner, and lower link support units 78, 78 provided in the lower part of both ends thereof to support the lower link 49 (FIGS. 2, 3) in a freely rockable manner. The rear lateral member 54 includes arm support sections 79, 79 (FIG. 3) formed on both ends thereof to support the lower arms 47 in a freely rockable manner.

The left and right longitudinal members 51 each have front and rear fastening sections 56, 57 that are fastened with the pair of rear side frames 15, and bent sections 58 each bent inward in the vehicle width direction in a projecting manner between the front and rear fastening sections 56, 57. Rear bent sections 59 each bent inward in the vehicle width direction are provided behind the bent sections 58.

Figure 6:
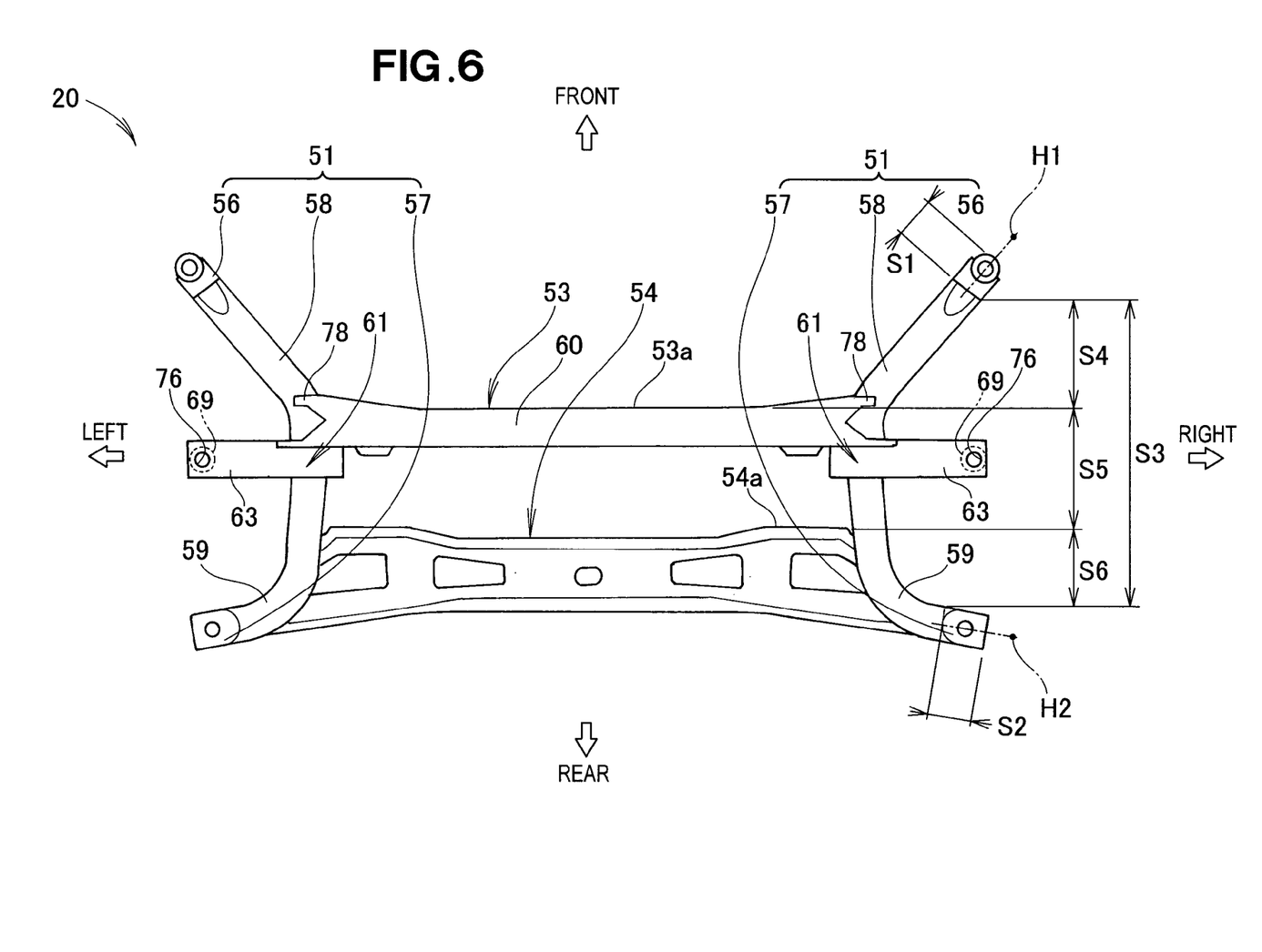
FIG. 6 is a bottom view of the rear sub-frame of FIG. 4.

As illustrated in FIG. 6, it is defined that a front fastening section is indicated by a reference sign S1, a rear fastening section is indicated by a reference sign S2, a bent section is indicated by a reference sign S3, a front part of the bent section 58 is indicated by a reference sing S4, an intermediate portion of the bent section 58 is indicated by a reference sign S5, and a rear part of the bent section 58 is indicated by a reference sign S6.

The portion of the front fastening section 51 represents a length in an extending direction H1 of the front fastening section 56, the portion of the rear fastening section S2 represents a length in an extending direction H2 of the rear fastening section 57, and the portion of the bent section S3 (which covers from the front portion S4 of the bent section 58 to the rear portion S6 of the bent section 58) represents a length of the vehicle body 11 of the bent section 58 in the front-rear direction. A front end 53a of the front lateral member 53 corresponds to the boundary between the front portion S4 of the bent section 58 and the intermediate portion S5 of the bent section 58. A front end 54a of the rear lateral member 54 corresponds to the boundary between the intermediate portion S5 of the bent section 58 and the rear portion S6 of the bent section 58. The rear bent sections 59 that bent inward in the vehicle width direction in the rear portion S6 is provided, which will be described later.

Specifically, the lateral member (front lateral member) 53 is positioned relative to the left and right longitudinal members 51 at the intermediate portion S5 of the left and right bent sections 58. The front lateral member 53 includes a lateral member body 60, and connecting members 61, 61 that fasten the left and right longitudinal members 51 to the rear side frames 15.

Figure 7:
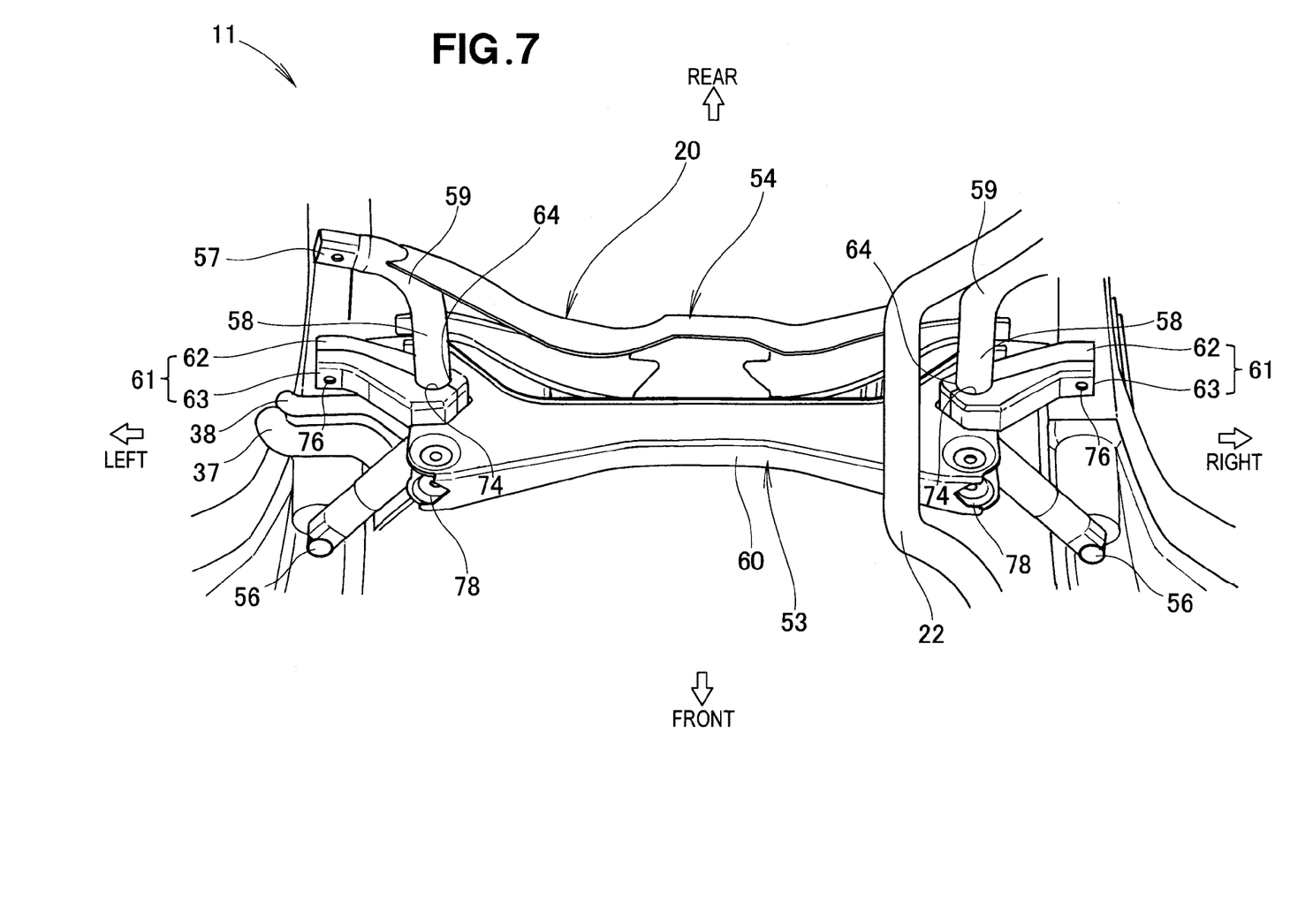
FIG. 7 is a perspective view of the vehicle body rear part structure of FIG. 1, as seen from the lower part of the vehicle body rear part.
Figure 8:
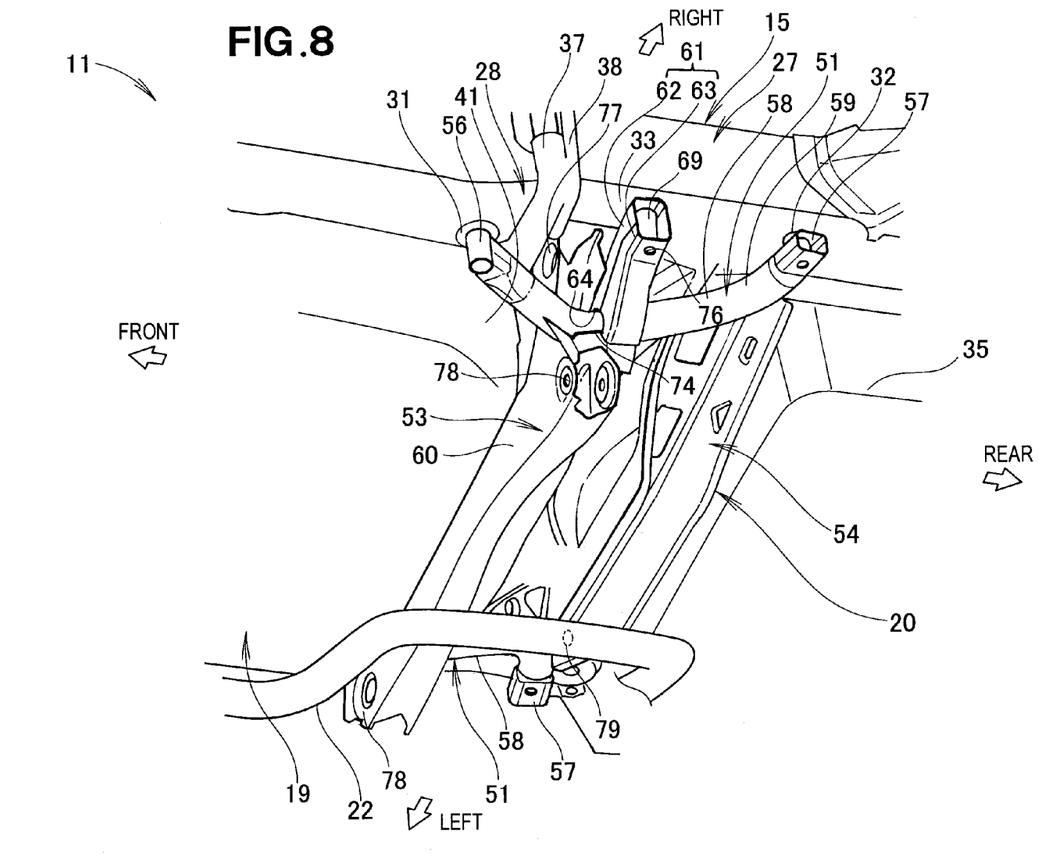
FIG. 8 is a perspective view of the vehicle body rear part structure of FIG. 1, as seen from the bottom of the vehicle body side part.
Figure 9:
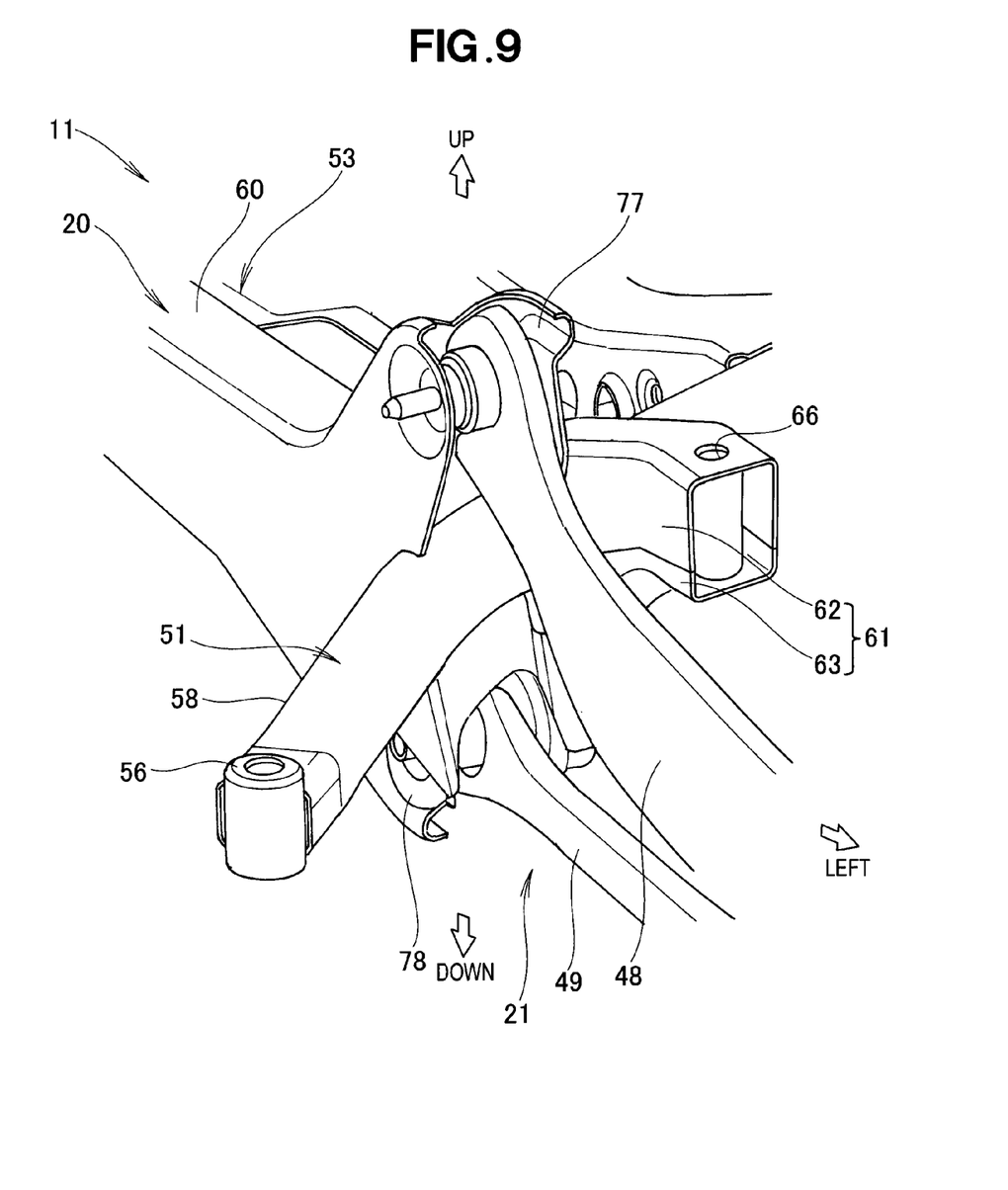
FIG. 9 is a perspective view showing an upper link and a lower link of the vehicle body rear part structure of FIG. 1.

As illustrated in FIG. 7, each of the connecting member 61 includes an upper piece 62 connected to the front lateral member 53, and a lower piece 63 fastened to the upper piece 62. The upper and lower pieces 62, 63 are coupled to the lateral member (front lateral member) 53. Specifically, the front lateral member 53 is formed by integrating the lateral member body 60 with the connecting members 61, 61, and the connecting member 61 is coupled to the front lateral member 53.

Figure 5:
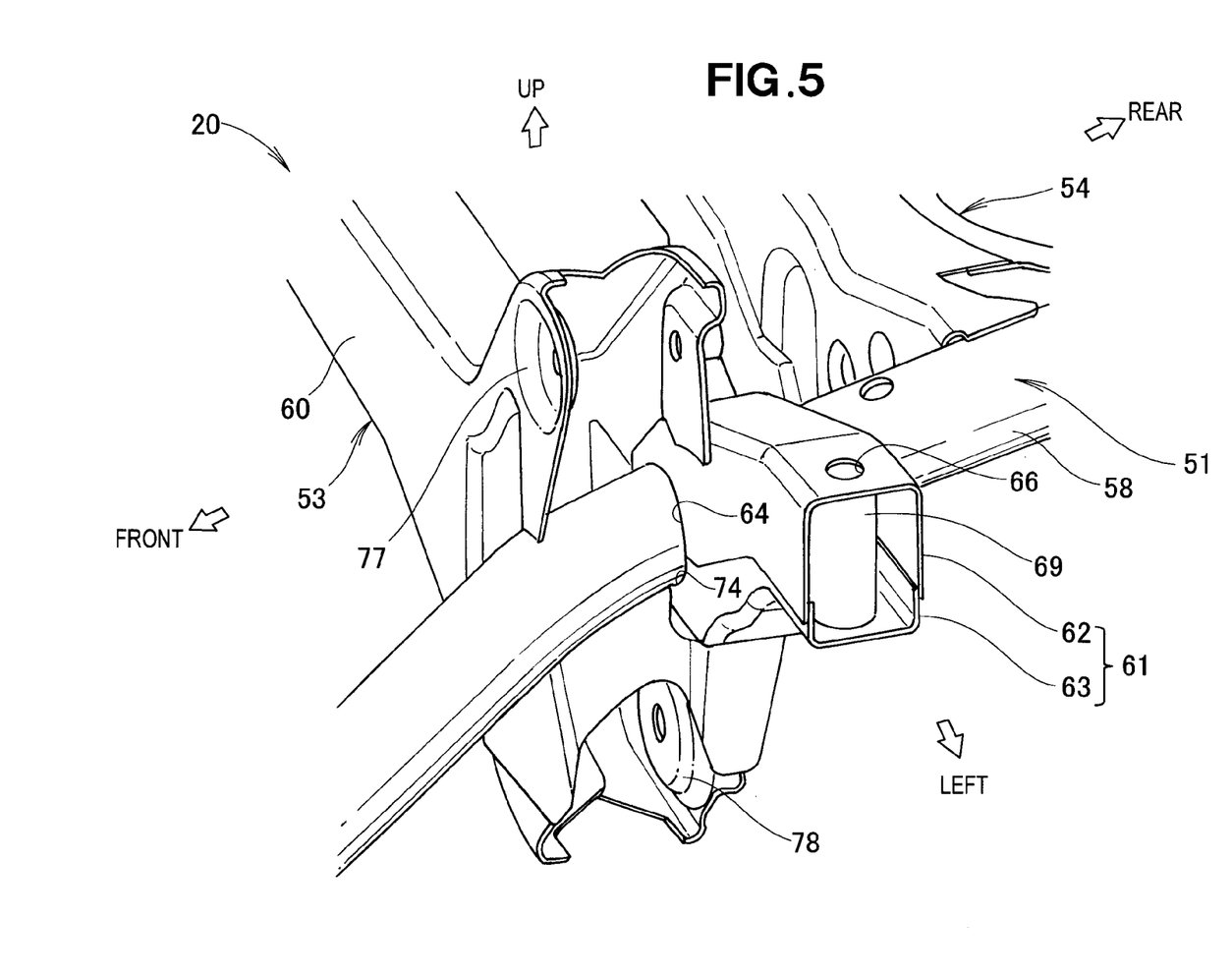
FIG. 5 is an enlarged view of region 5 of FIG. 4.

As illustrated in FIG. 5, the upper piece 62 is a member having a U-shaped cross-section, and includes an upper clamping section 64 that sandwiches the longitudinal member 51, and an upper through hole 66 through which a bolt 72 (FIG. 3) is penetrated to fasten to the rear side frame 15 with the lower piece 63. The upper through hole 66 is provided with a collar 69 through which the bolt 72 (FIG. 3) is penetrated to fasten to the rear side frame 15 with the lower piece 63.

The lower piece 63 is a member having a U-shaped cross-section, and includes a lower clamping section 74 that sandwiches the longitudinal members 51, and a lower through hole 76 (FIG. 6) in which the bolt 72 (FIG. 3) to fasten to the rear side frame 15 with the upper piece 62. Specifically, as illustrated in FIG. 6, the intermediate portion S5 of the left and right bent sections 58 of the left and right longitudinal members 51 are connected to the pair of rear side frames 15 by the left and right connecting members 61. Since the connecting members 61 are shifted in the front-rear direction of the vehicle body 11 relative to the lateral member body 60 of the front lateral member 53 that is laid between the left and right longitudinal members 51, there is vacant space in front of the connecting members 61 where the suspension arm (e.g., upper link 48) or the like can be extended outward in the vehicle width direction.

Figure 10A:
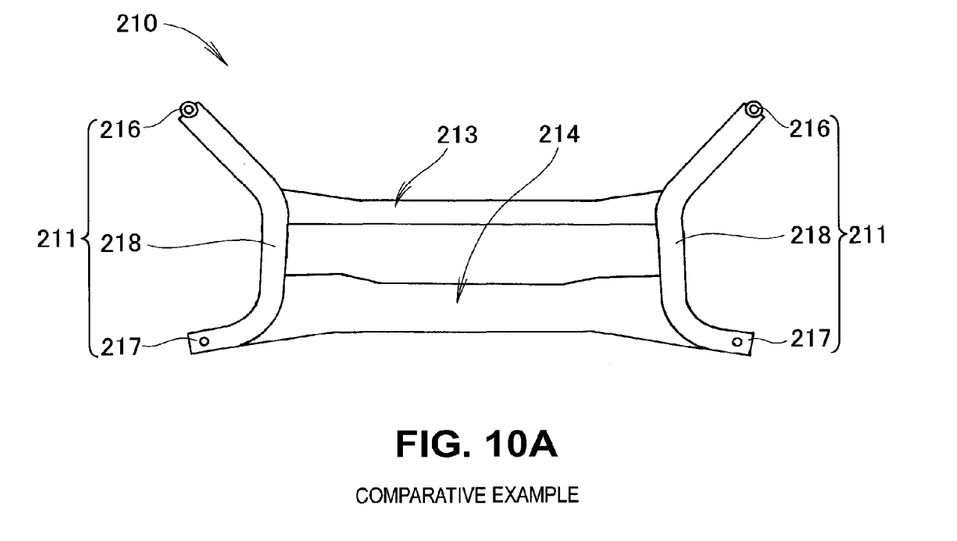
FIG. 10A illustrates a rear sub-frame of a known example for comparison, whilst

FIG. 10A illustrates a rear sub-frame 210 of a comparative example. The rear sub-frame 210 includes left and right longitudinal members 211 extending in the front-rear direction of the vehicle body, a front lateral member 213 extending in the vehicle width direction and laid between the left and right longitudinal members 211, and a rear lateral member 214 arranged behind the front lateral member 213 in the vehicle rear part to extend in the vehicle width direction and laid between the left and right longitudinal members 211. The left and right longitudinal members 211 include front and rear fastening sections 216, 217 that are fastened with the pair of rear side frames, and left and right bent sections 218 that bent inward in the vehicle width direction in a projecting manner between the front and rear fastening sections 216, 217.

Figure 11A:
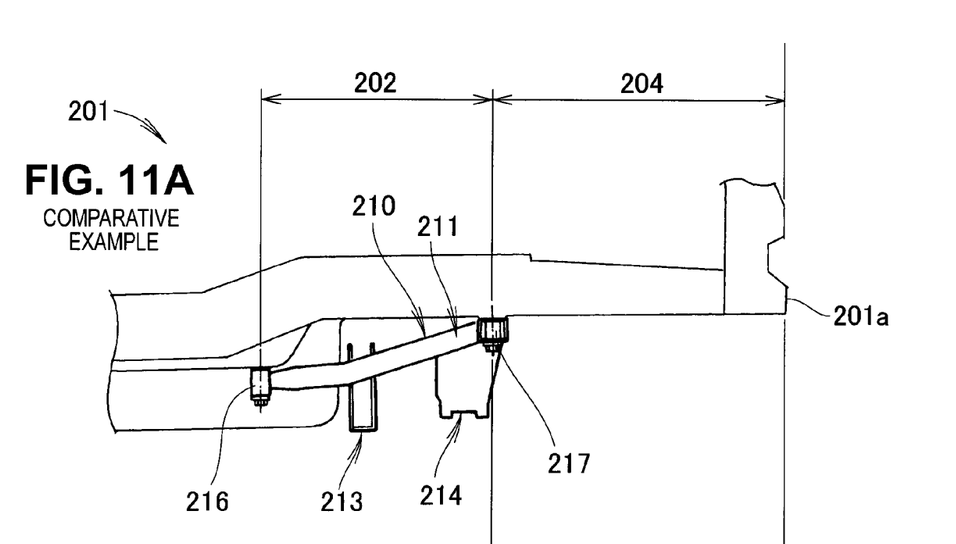
FIG. 11A illustrates a vehicle body rear part structure of the known example for comparison, whilst

FIG. 11A illustrates part of the structure for the rear part of the vehicle body of the comparative example, in which the rear sub-frame 210 is mounted on the vehicle body 201. In the structure for the rear part of the vehicle body of the comparative example, the section from the front fastening section 216 to the rear fastening section 217 of the rear sub-frame 210 is set as a protecting portion (portion not to crush the vehicle body 201) 202 to restrict deformation of the vehicle body 201. The section from the rear fastening section 217 of the rear sub-frame 210 to the rear end 201a of the vehicle body 201 is set as a collision stroke portion (energy absorbing portion) 204. However, if a sufficient distance between the rear fastening section 217 of the rear sub-frame 210, which is assumed to be the collision stroke portion 204, and the rear end 201a of the vehicle body 201 cannot be secured in the vehicle, it is desirable to increase the collision stroke.

Figure 10B:
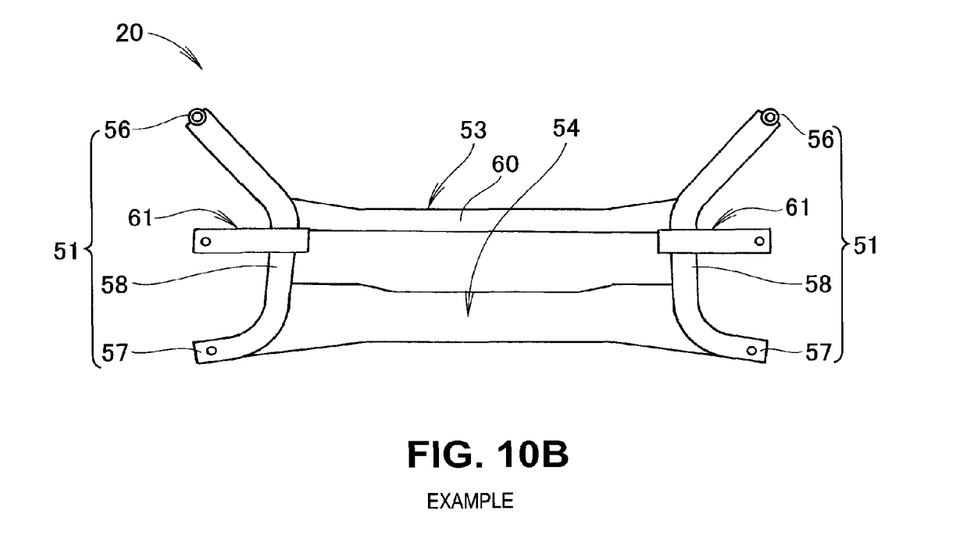
FIG. 10B illustrates a rear sub-frame of the inventive embodiment.

FIG. 10B illustrates the rear sub-frame 20 of the present example. The rear sub-frame 20 includes the left and right longitudinal members 51 extending in the front-rear direction of the vehicle body 11, the lateral member (front lateral member) 53 extending in the vehicle width direction and laid between the left and right longitudinal members 51, and the rear lateral member 54 arranged in the rear part of the vehicle body behind the front lateral member 53 to extend in the vehicle width direction and laid between the left and right longitudinal members 51. The left and right longitudinal members 51 include front and rear fastening sections 56, 57 that are fastened with the pair of rear side frames 15, and left and right bent sections 58 each bent inward in the vehicle width direction in a projecting manner between the front and rear fastening sections 56, 57. Further, the connecting members 61, 61 configured to fasten the left and right longitudinal members 51 to the rear side frames 15 are provided on the front lateral member 53.

Figure 11B:
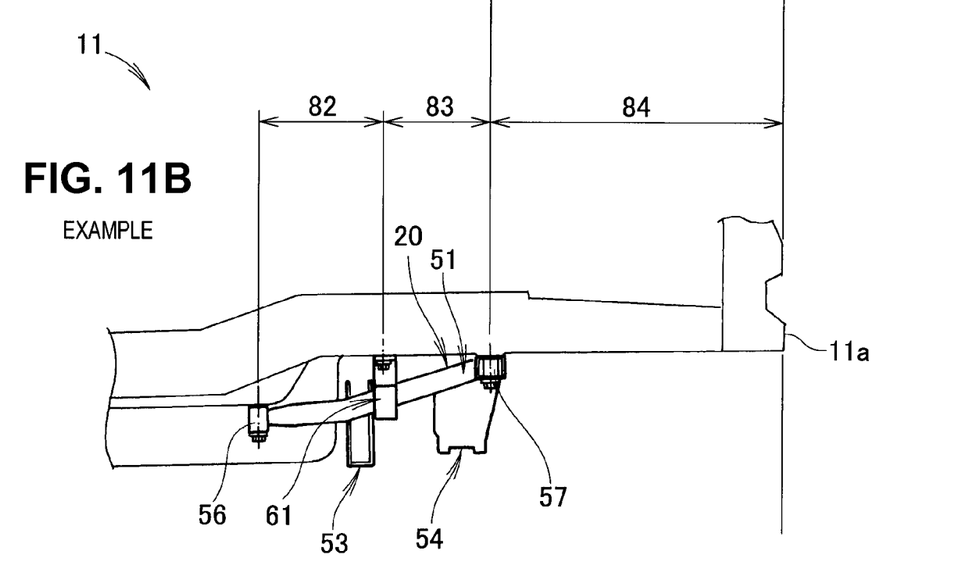
FIG. 11B illustrates the vehicle body rear part structure of the inventive embodiment.

FIG. 11B illustrates the structure for the rear part of the vehicle body of the present example, in which the rear sub-frame 20 is mounted on the vehicle body 11. In the structure for the rear part of the vehicle body of the example, the connecting members 61, 61 configured to fasten the left and right longitudinal members 51 to the rear side frames 15 are provided on the front lateral member 53. Therefore, the longitudinal member 51 can be divided into the front portion from the front fastening section 56 to the front lateral member 53 and the connecting member 61, and the rear portion from the front lateral member 53 and the connecting member 61 to the rear fastening section 57.

Specifically, the front portion is set as a protecting portion 82 to restrict deformation of the vehicle body 11 (portion not to crush the vehicle body 11), and the rear portion is set as a deformation allowable section 83 to allow deformation of the vehicle body 11. The deformation allowable portion 83 can be added to the collision stroke portion (energy absorbing section) 84 from the rear fastening section 57 of the rear sub-frame 20 to the rear end 11a of the vehicle body 11. As a result, the energy absorbing portion can be substantially extended. The collision stroke portion 84 has the same length as the collision stroke portion 204 of the comparative example illustrated in FIG. 11A.

As illustrated in FIGS. 1 to 11B, the structure for the rear part of the vehicle body includes the pair of rear side frames 15 extending in the front-rear direction of the vehicle body 11, and the rear sub-frame 20 supported by the rear side frames 15. The pair of rear side frames 15 include the pair of curved sections 28 that are curved such that the frame front parts 26 are lower than the frame rear parts 27. The rear sub-frame 20 includes the left and right longitudinal members 51 extending in the front-rear direction of the vehicle body 11, and the lateral member (front lateral member) 53 extending in the vehicle width direction and laid between the left and right longitudinal members 51. The left and right longitudinal members 51 include front and rear fastening sections 56, 57 that are fastened with the pair of rear side frames 15, and left and right bent sections 58 each bent inward in the vehicle width direction in a projecting manner between the front and rear fastening sections 56, 57.

As illustrated in FIG. 6, the lateral member (front lateral member) 53 is positioned relative to the left and right longitudinal members 51 at the intermediate portion S5 of the left and right bent sections 58. At the intermediate portion S5 of the left and right bent sections 58 of the left and right longitudinal members 51, the lateral member 53 holds the left and right longitudinal members 51 and are connected to the pair of rear side frames 15. Therefore, each of the left and right bent sections 58 can be divided into the front portion from the front fastening section 56 to the connecting member 61 and the rear portion from the connecting member 61 to the rear fastening section 57 in the front-rear direction of the vehicle body 11. Further, the rear bent sections 59 that bend inward in the vehicle width direction are provided behind the bent sections 58 to securely bend the rear portions S6 beyond the bent sections 58.

Specifically, as illustrated in FIG. 11B, the front side portion is set as the protecting portion 82 (portion not to crush the vehicle body 11) to restrict deformation of the vehicle body 11, and the rear side portion is set as the deformation allowable portion 83 to allow deformation of the vehicle body 11. As a result, when the rear collision load is acted from the rear of the vehicle body 11, deformation of the front side portion of the rear sub-frame 20 can be prevented, while the rear side portion of the rear sub-frame 20 can be used for impact absorption (crush stroke). Therefore, sufficient impact absorption can be realized even when the vehicle has insufficient collision stroke portion (energy absorbing portion) 84 from the rear end 11a to the rear fastening section 57 of the vehicle body 11.

As illustrated in FIGS. 6 and 7, in the structure for the rear part of the vehicle body, the lateral member (front lateral member) 53 is positioned at the intermediate portion S5 of the left and right bent sections 58 of the left and right longitudinal members 51, and is provided with the left and right connecting members 61 that connect to each of the pair of rear side frames 15. Accordingly, strength and rigidity against the rear collision load of the rear sub-frame 20 can be improved, while the intermediate portion S5 of the left and right bent sections 58 can be held easily by the pair of rear side frames 15 (FIG. 1). Therefore, when the rear collision load is acted from the rear of the vehicle body 11, the vehicle body region (protecting portion 82) in front of the left and right connecting members 61 can be protected.

As illustrated in FIGS. 1 to 3, in the structure for the rear part of the vehicle body, the fuel tank 19 is provided in front of the lateral member (front lateral member) 53 and mounted on the vehicle body 11. The filler pipe 37 is provided on the fuel tank 19. The filler pipe 37 extends from the fuel tank 19 and runs under the curved section 28 and in front of the connecting member 61 to go out to the side of the vehicle body 11. The filler pipe 37 can be protected from the rear collision load. As a result, the reliability of the filler pipe 37 against the rear collision load can be improved.

Although the structure for the rear part of the vehicle body according to the present invention includes the curved sections 28 that are curved in the rear side frames 15 such that the frame front parts 26 are lower than the frame rear parts 27, as illustrated in FIG. 2, it is not limited thereto and the curved sections may be formed as downwardly inclining parts from the frame rear part to the frame front part.

Although the structure for the rear part of the vehicle body according to the present invention includes the longitudinal members 51 sandwiched between the upper and lower pieces 62, 63 of the connecting members 61, as illustrated in FIG. 5, it is not limited thereto and the connecting members may be coupled with the longitudinal members, for example, by welding.

Although the structure for the rear part of the vehicle body according to the present invention as illustrated in FIGS. 1 to 3 includes the filler pipe 37 that runs between the bottom of the curved section 28 and the left longitudinal member 51 in a side view and between the left longitudinal member 51 and the connecting member 61 in a planar view to go out to the side of the vehicle body 11, it is not limited thereto and the filler pipe 37 may run between the bottom of the curved section 28 and the right longitudinal member and between the right longitudinal member and the connecting member 61 in a planar view to go out to the side of the vehicle body 11.

The structure for the rear part of the vehicle body includes, as illustrated in FIG. 2, the front mounting sections 31 to which the front fastening sections 56 are fastened in the curved sections 28 of the rear side frames 15, and the rear mounting sections 32 to which the rear fastening sections 57 are fastened in the frame rear parts 27. However, it is not necessarily required to provide the front mounting sections 31 to which the front fastening sections 56 are fastened in the curved sections 28, and the rear mounting sections 32 to which the rear fastening sections 57 are fastened in the frame rear parts 27, so long as part or all of the curved sections of the rear side frames exist between the front fastening sections and the rear fastening sections of the rear sub-frame.

INDUSTRIAL APPLICABILITY

The structure for the rear part of the vehicle body according to the present invention is preferably applied to a passenger vehicle such as sedans and wagons.

REFERENCE SIGNS LIST

10: Vehicle, 11: Vehicle body, 15: Rear side frame, 20: Rear sub-frame, 26: Frame front part, 27: Frame rear part, 28: Curved section, 51: left and right longitudinal members, 53: lateral member (front lateral member), 56, 57: Front and rear fastening sections, 58: Bent section, 61: Connecting member.

The invention claimed is:

1. A vehicle body rear part structure comprising:
    a pair of left and right rear side frames extending in a front-rear direction of a vehicle body; and
    a rear sub-frame supported by the left and right rear side frames,
wherein each of the left and right rear side frames includes a curved section curved such that a frame front part is lower than a frame rear part,
    the rear sub-frame includes left and right longitudinal members extending in the front-rear direction of the vehicle body and a lateral member extending in a vehicle width direction and stretched between the left and right longitudinal members,
    the left and right longitudinal members each have front and rear fastening sections fastened to each of the left and right rear side frames, left and right bent sections each bent inward in the vehicle width direction in a projecting manner between the front and rear fastening sections, and rear bent sections each bent inward from the rear fastening section in the vehicle width direction behind the bent sections,
    the lateral member is positioned relative to the left and right longitudinal members at an intermediate portion of the left and right bent sections of the left and right longitudinal members, and
    the intermediate portion of the left and right bent sections is joined to the pair of the left and right rear side frames while the left and right longitudinal members are held by the lateral member.

2. The vehicle body rear part structure according to claim 1, wherein the lateral member includes left and right connecting members connected to the left and right rear side frames at the intermediate portion of the left and right bent sections of the left and right longitudinal members.

3. The vehicle body rear part structure according to claim 2, wherein a fuel tank is provided in front of the lateral member and a filler pipe is provided on the fuel tank, the filler pipe extending from the fuel tank and running under the curved section and in front of one of the left and right connecting members to go out to a side of the vehicle body.

* * * * *